United States Patent
Nakashima et al.

[11] Patent Number: 6,082,939
[45] Date of Patent: Jul. 4, 2000

[54] MACHINE TOOL AND COVER APPARATUS THEREFOR

[75] Inventors: Kunimichi Nakashima, Anjo; Tetsuo Teramura, Nagoya; Yasukazu Yamaguchi, Chiryu; Akiyoshi Tashiro, Kariya; Hirotaka Imaizumi, Toyohashi; Mitsuyoshi Taniguchi, Takahama; Koji Toyama, Toyoake, all of Japan

[73] Assignee: Toyoda Koki Kabushiki Kaisha, Kariya, Japan

[21] Appl. No.: 09/149,085

[22] Filed: Sep. 8, 1998

[30] Foreign Application Priority Data

| Jul. 9, 1998 | [JP] | Japan | 10-194595 |
| Jul. 17, 1998 | [JP] | Japan | 10-219763 |

[51] Int. Cl.⁷ .............................. B23C 9/00; B23Q 11/08; B23B 21/00
[52] U.S. Cl. ............................. 409/134; 82/132; 409/219
[58] Field of Search .................................. 409/134, 219, 409/137; 29/27 R, 27 A, DIG. 56; 82/132, 141; 83/412; 72/389

[56] References Cited

U.S. PATENT DOCUMENTS

| 2,648,999 | 8/1953 | Stephan | 409/219 X |
| 4,084,424 | 4/1978 | Roch et al. | 72/389 |
| 4,429,443 | 2/1984 | Koelblin et al. | 29/26 A |
| 4,669,346 | 6/1987 | Benedict | 83/412 |
| 4,673,076 | 6/1987 | Mattson | 414/786 X |
| 4,955,770 | 9/1990 | Kitamura | 409/137 |
| 5,365,991 | 11/1994 | Wright et al. | 29/DIG. 56 X |
| 5,546,836 | 8/1996 | Choi | 82/132 |
| 5,611,137 | 3/1997 | Braun | 29/27 A X |

FOREIGN PATENT DOCUMENTS 58-93437  6/1983  Japan.

*Primary Examiner*—William Briggs
*Attorney, Agent, or Firm*—Oblon, Spivak, McClelland, Maier & Neustadt, P.C.

[57] ABSTRACT

In a machine tool having a worktable feed mechanism of the type that a worktable is moved in a horizontal direction relative to a tool spindle along a pair of guideways in parallel with the horizontal direction, there is provided a cutting chips collection space formed between the pair of guideways fixed to a base. A pair of ball screws are arranged outside of the cutting chips collection space for moving the worktable relative to the tool spindle in the horizontal direction. The cutting chips and coolant generated by contacting a tool with a workpiece drop into the cutting chips collection space directly without being heaped onto a cover mechanism of the worktable feed mechanism.

9 Claims, 9 Drawing Sheets

MACHINE TOOL AND COVER APPARATUS THEREFOR

BACKGROUND OF THE INVENTION

1. Field of the Invention

The present invention relates to a machine tool for machining a workpiece by advancing and retracting the workpiece toward and away from a tool spindle in a direction along with a rotational axis of the tool spindle. More particularly, the present invention relates to workplece feed mechanism of a machine tool having a pair of guideways for advancing and retracting the workpiece in a horizontal direction along a rotational axis of the tool spindle. Further, the present invention relates to a cover apparatus for preventing from spattering cutting chips, coolant and the like for a machine tool.

2. Description of the Related Arts

A conventional machine tool will be explained hereinafter with reference to FIGS. 1 and 2 basically corresponding to that disclosed in U.S. Pat. No. 4,673,076.

In such a conventional machine tool, a column 214 is mounted on a bed 230, which is movable in an X-axis direction along a pair of guide rails 216 by a motor 215. In the front of the column 214, there is provided a tool spindle 221 being movable in a Y-axis direction along a pair of guide rails 223 by a motor 222. A worktable 211 is arranged on the bed 230 and in the front of the column 214, which is moved in a Z-axis direction along a pair of guide rails 213 through a ball screw (not shown) by a motor 212.

A pallet changer 205 is arranged on the bed 230 and in the front of the worktable 211, in which a pallet 207 mounting a machined workpiece is changed to a pallet mounting a yet unmachined workpiece by rotating the pallet changer 205 at 180 degrees.

As shown in FIG. 2, the guide rails 213 and the ball screw are covered by a telescopic cover 203 that has a peaked portion in the middle thereof. With this construction, since the guide rails 213 and ball screw are covered by the telescopic cover 203, even though cutting chips are generated when the workpiece mounted on the pallet 207 is machined by a tool (not shown) attached to an end portion of the tool spindle 221, the guide rails 213 are not begrimed by the cutting chips. In such a construction, there is an advantage in that a worktable feed mechanism for moving the workpiece can be also used for the pallet changing operation.

A pair of cutting chip exhaust grooves 231 are formed outside of the pair of guide rails 213 and on the bed 230. Generally outside of the exhaust grooves 231, there are provided a pair of cutting chip splash preventing covers 201 extending from the front of column 214 to the worktable 211. A slide door 204 is provided at a right side of the preventing cover 201 in which the maintenance of the tool spindle can be carried out by opening the slide door 204.

The preventing cover 201 is outwardly expanded close to a portion where the machined workpiece is mounted on the pallet 207, which is connected with an entire cover 200 having a half-round shape in the cross-sectional plane thereof for covering the bed 230 and the pallet 208 mounting the not-machined workpiece.

A revolving door 209 is arranged so as to rotate with the pallet changer 205 around a rotational axis thereof. Both end portions of the revolving door 209 are closely faced with both protruding portions 200a arranged at end portions of the entire cover 200, respectively. Therefore, the pallet 208 on which the not-machined workpiece is mounted is separated from the machining area by the revolving door 209.

Thus, the machining area that the tool spindle 221 moves in the machining operation is separated by the preventing covers 201 and the revolving door 209, so that the cutting chips generating in the machining operation are impounded within the machining area thereby. In this situation, the cutting chips drop into the exhaust grooves 231 together with coolant, thereby being exhausted to the front or back of the machine tool by a coil conveyer (not shown) and the like.

However, since the cutting chips drop onto the telescopic cover 203 from the tool attached with the tool spindle 221, the cutting chips heap onto the telescopic cover 203, whereby it is disadvantageous that the cutting chips on the telescopic cover 221 cannot be removed perfectly.

Further, in another conventional machine tool as disclosed in Japanese Patent Publication No. 60-23935 (KOKOKU), there is provided a cutting chips collection device in a bed so as to position under a slide type cover mechanism for covering a feed screw. With this construction, cutting chips from a machining point can be directly heaped onto the cutting chips collection device and however, it is disadvantageous that a part of the cutting chips are left on the slide cover mechanism.

SUMMARY OF THE INVENTION

Accordingly, an object of the present invention is to provide a machine tool which can easily collect the cutting chips and coolant without heaping on a worktable feed mechanism.

Briefly, according to the present invention, a machine tool having a worktable feed mechanism in which a worktable is moved in a horizontal direction relative to a tool spindle along a pair of guideways in parallel with the horizontal direction comprises a base, a cutting chips collection space formed between the pair of guideways fixed to the base, and a pair of ball screws for moving the worktable relative to the tool spindle in the horizontal direction, wherein each of the pair ball screws is arranged outside of the cutting chips collection space.

With this construction, each of the pair ball screws is arranged outside of the cutting chip collection space, so that the pair of ball screws does not prevent the cutting chips from collecting. Therefore, such problems can be removed that the cutting chips heap on a cover mechanism for the ball screw and also that the cutting chips and coolant are not completely collected.

Further, since a collection opening is formed in said base under the cutting chips collection space so as to open upwardly, the cutting chips from the machining point can be effectively collected from the collection opening.

In the above-mentioned configuration, a splash cover is further arranged between the ball screws and the cutting chips collection space, so that the cutting chips can be prevented from splashing outside the machine tool.

Furthermore, since the splash cover is composed of an expandable cover changing a cover area thereof in the horizontal direction with the movement of the worktable and a fixed cover arranged above said expandable cover, the cutting chips can be prevented from splashing outside of the machine tool by the movement of the worktable.

Still further, the above-described machine tool has a pallet arranged on the worktable for mounting a workpiece to be machined and a pallet changer for changing the pallet to new one upon rotation thereof at a retractive position of the worktable. Therefore, the workpiece can be automatically changed. In this configuration, the pallet changer further provides a pallet changer cover rotatably provided on a rotational center of the pallet changer for covering the worktable and the pallet at the retractive position of the worktable, it is prevented that the cutting chips splash from a back side of the worktable outwardly.

In the machine tool described hereinbefore, there is further provided an entire cover continuously provided from the fixed cover for covering a rotational area of the pallet changer cover upon rotation of the pallet changer, so that the operator cannot access within the rotational area of the pallet changer cover, whereby the safety of the machine tool can be improved.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENTS

An embodiment according to the present invention will be described with reference to the drawings.

Figure 1:
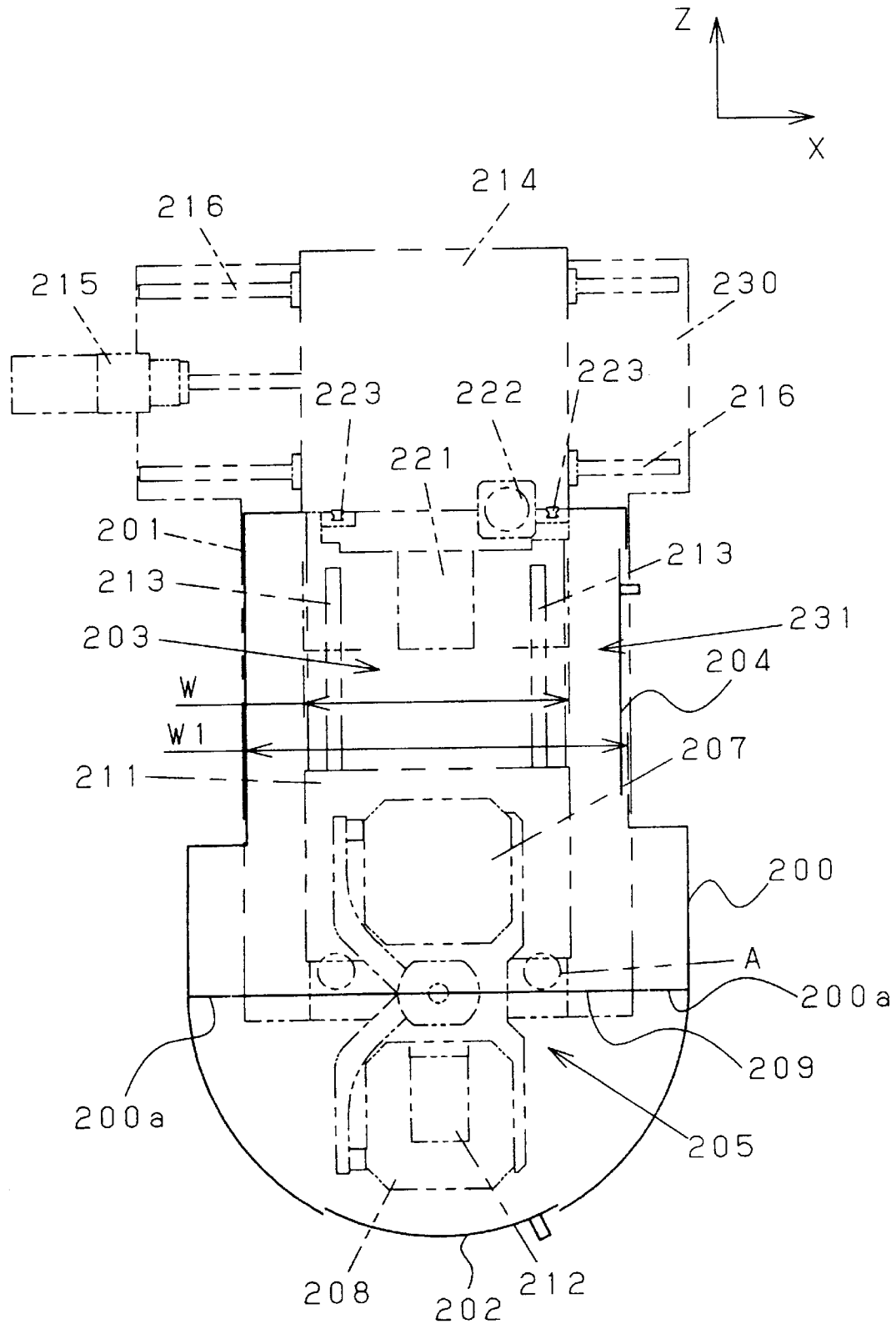
FIG. 1 is a top plan view of a conventional machine tool equipped with a pallet changer and an entire cover therefor.
Figure 2:
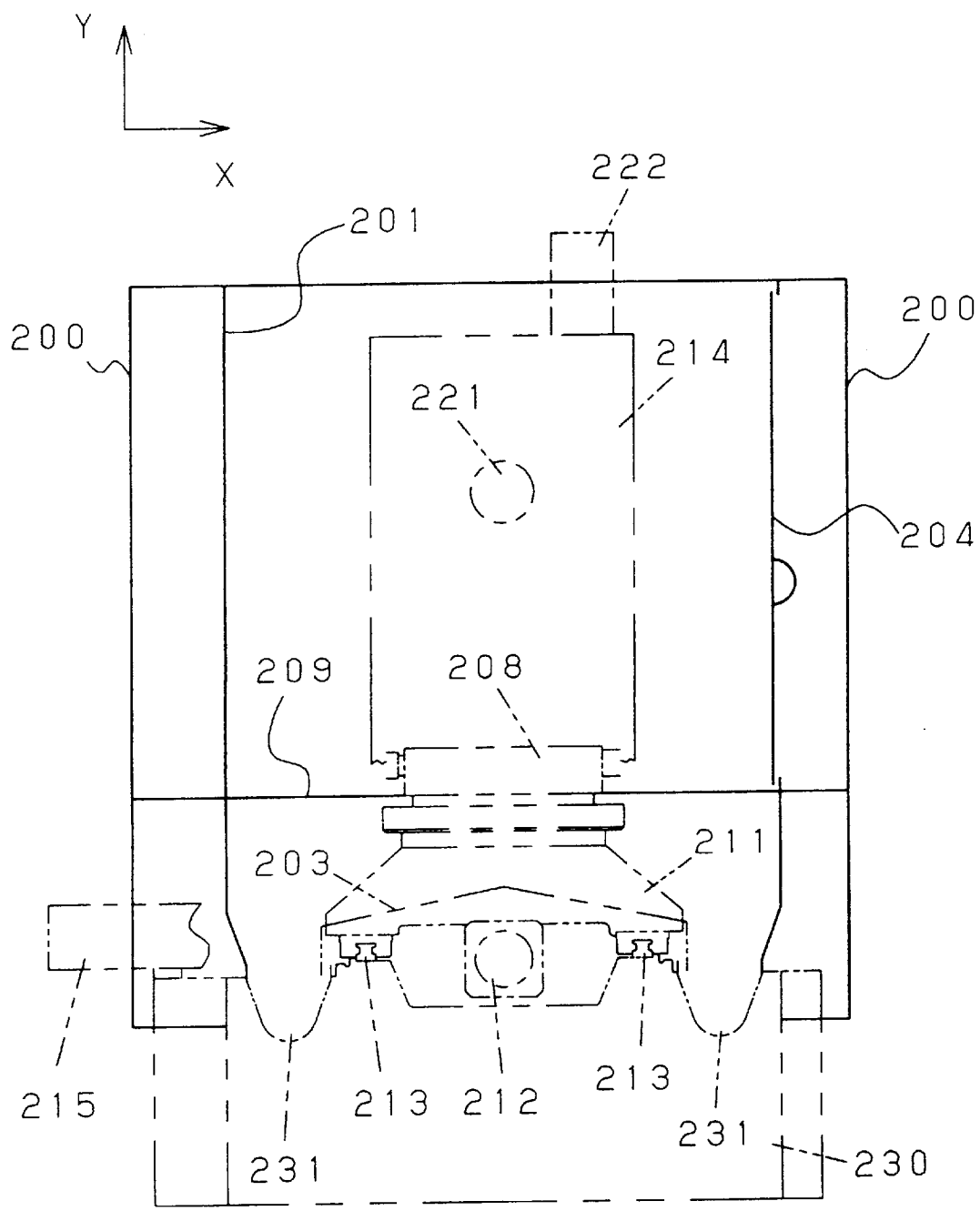
FIG. 2 is a front elevational view of the conventional machine tool shown in FIG. 2.
Figure 3:
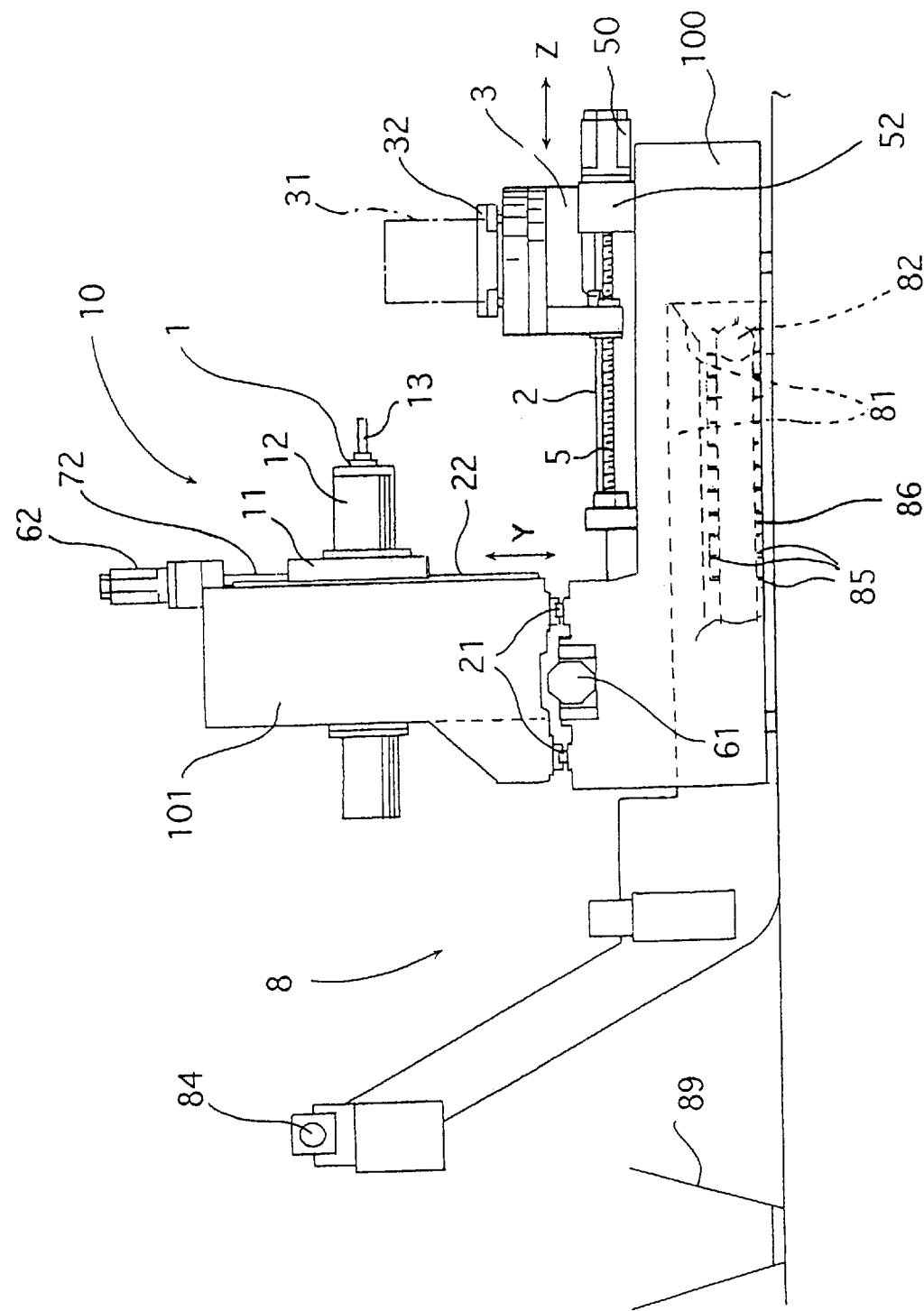
FIG. 3 is a side elevational view showing a worktable feed mechanism of a machine tool according to an embodiment of the present invention.
Figure 4:
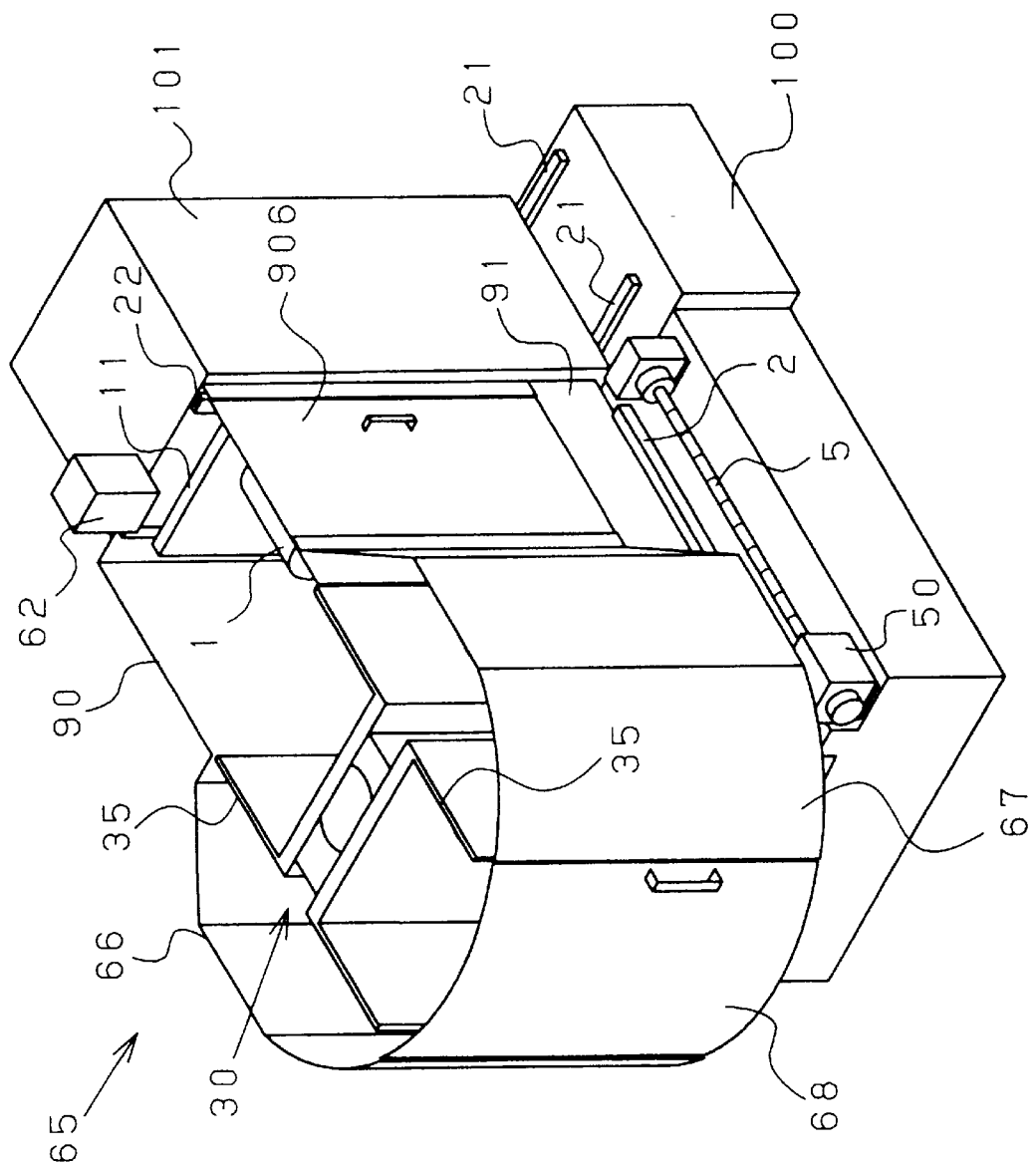
FIG. 4 is a perspective view of the machine tool including a pallet changer and an entire cover shown in FIG. 3.
Figure 5:
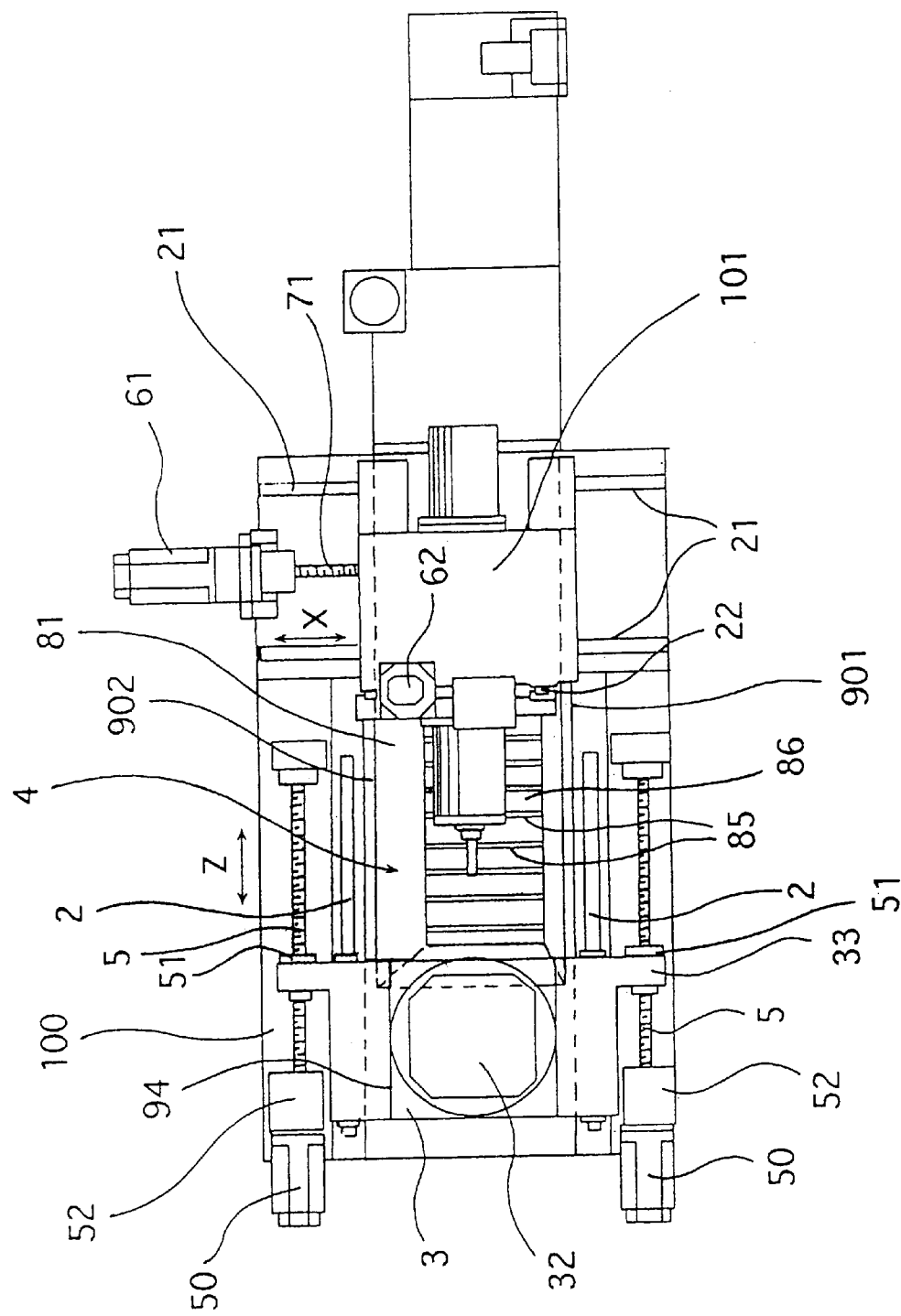
FIG. 5 is a top plan view of the worktable feed mechanism of the machine tool shown in FIG. 3.

As shown in to FIGS. 3–5, a worktable 3 in a machine tool according to the embodiment is advanced and retracted relative to a tool spindle 1 along a pair of guideways 2. in parallel with a rotational axis of the tool spindle 1, which guideways are fixed on a base 100. A depressed portion 4 as a cutting chips collecting space is formed between the pair of guideways 2 fixed on the bed 100. Further, a pair of right and left feed screws 5 are respectively arranged outside of the guideways 2 provided outside of the depressed portion 4.

In a worktable feed mechanism of the machine tool according to the embodiment, a machining portion 10 is mainly composed of a spindle head 11, a spindle unit 12 and a cutting tool 13. The spindle unit 12 for rotatably supporting the tool spindle 1 is fixed to the spindle unit 11 in which the cutting tool 13 is attachable to an end portion of the tool spindle 1. The spindle head 11 is slidably guided in a vertical direction in the front of a column 101. A position of the column 101 is controlled along a pair of guideways 21 arranged on the base 100 perpendicular to a longitudinal direction of the base 100 upon rotation of an X-axis servomotor 61 through a feed screw 71.

Similarly, a position of the spindle head 11 for supporting the spindle unit 12 is controlled through a feed screw 72 upon rotation of a Y-axis servomotor 62 attached on a front surface of the column 101 along a pair of guideways 22 provided on the front of the column 101, which guideways separate in the X-axis direction and extend in, the Y-axis direction.

Figure 6:
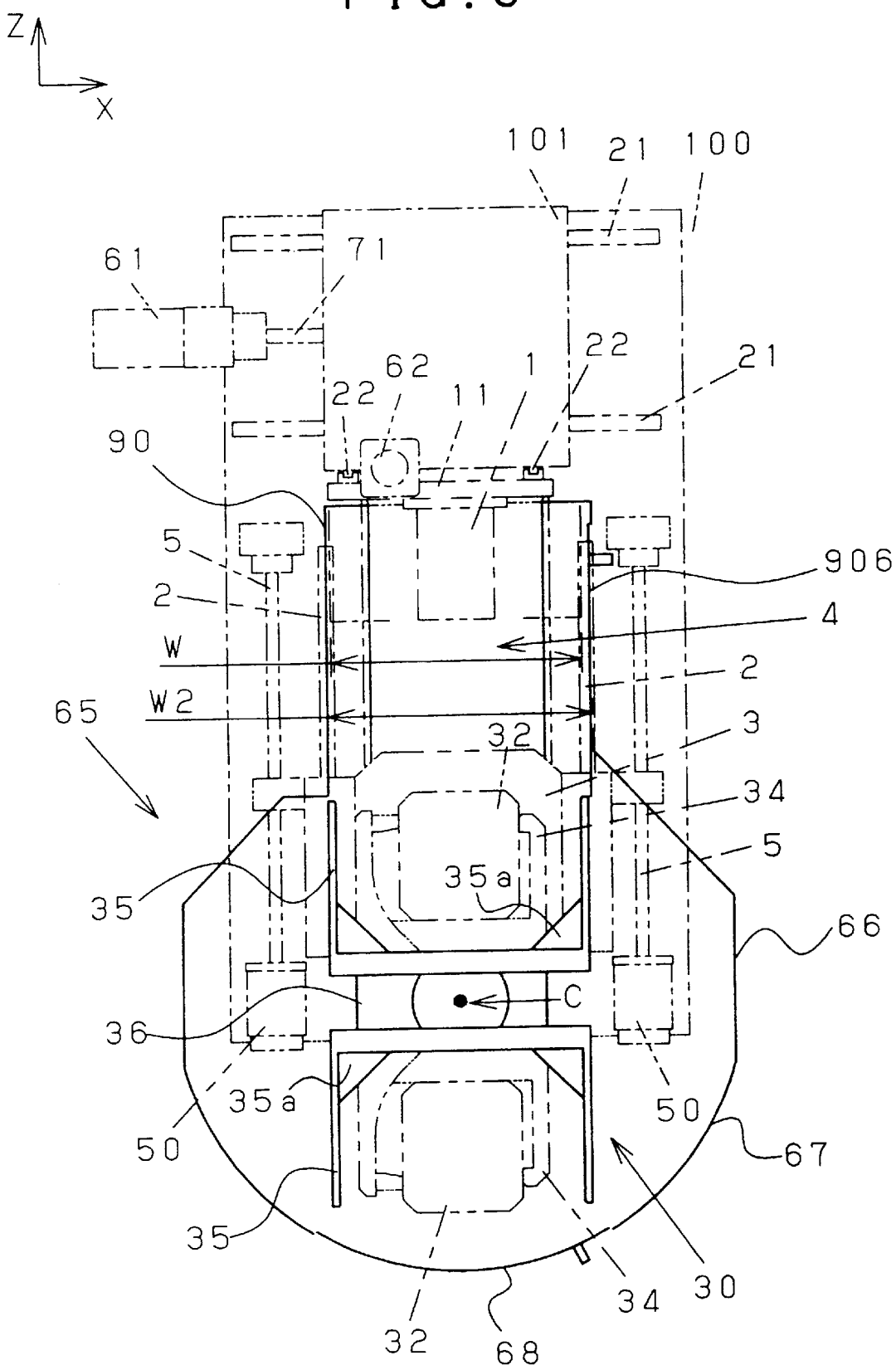
FIG. 6 is a top plan view of the machine tool shown in FIG. 4.

As shown in FIGS. 4 and 6, a pallet changer 30 which is eliminated to show in FIGS. 3 and 5 is rotatably equipped at a retractive position of the worktable 3, in which a pair of symmetric pallet changer covers 35 are provided around an index center C of pallet changer 30. In a middle portion of the pallet changer 30, there is a center frame 36 is arranged, front and rear surfaces of a lower portion of which a pair of arms 34 are fixed to so as to grip the pallets 32 on which workpieces 31 to be machined and having been machined are mounted. Further, rectangular pallet changer covers 35 opening to a side opposing to the center frame 34 are respectively attached to front and rear surfaces of the center frame 36 so as to cover the pallets 32, in which inclined portions 35a extending over the vertical direction of the pallet changer cover 35 are formed inside of both corner portions of the pallet changer covers 35.

The pallet changer 30 is indexed by 180 degree around the index center C to change the pallet 32 mounting the workpiece 31 having been machined to that to be machined. As shown in FIG. 6, the fixed cover 90 extends from a front position of the spindle head 101 to the worktable 3, and is faced with an edge portion of the pallet changer cover 35 at the retractive position of the worktable 3. Namely, width of the fixed cover 90 in the X-axis direction is approximately coincided with that of the pallet changer cover 35.

To permit the index movement of the pallet changer cover 35, there is a little clearance between the edge portions of the pallet changer cover 35 and the fixed cover 90. However, resin such a brush having an elasticity is attached to the front edge of the fixed cover 90 along the Y-axis direction, 80 that the clearance can be filled thereby, whereby the cutting chips and the like can be prevented from splashing outward of the fixed cover 90. In a case of the index operation of the pallet changer cover 35, it can be rotated by elastically deforming the brush.

Figure 7:
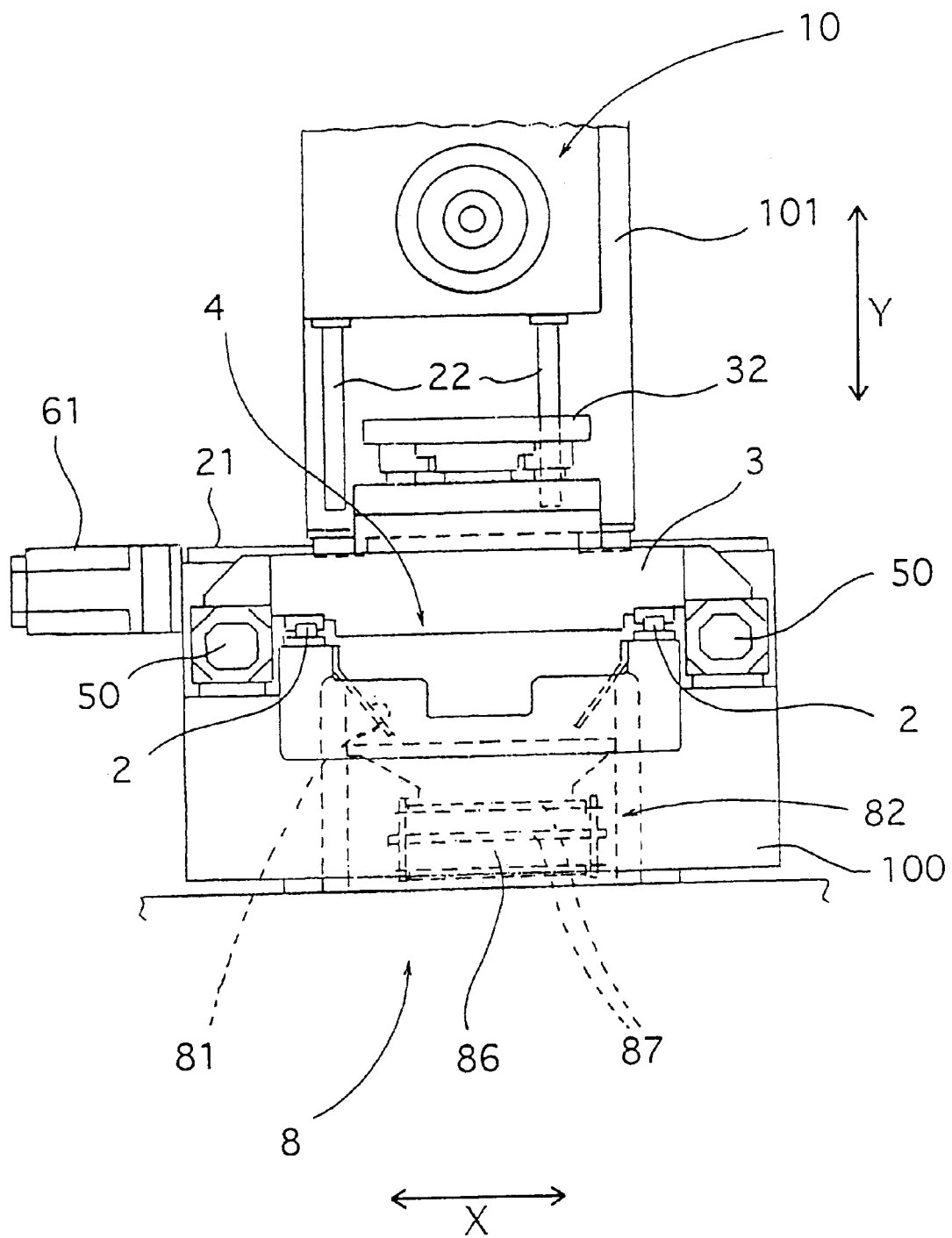
FIG. 7 is a front elevational view of the machine tool shown in FIG. 3.

As shown in FIGS. 3, 5 and 7, in a middle portion of the bed 100 in the x-axis direction, there is formed the depressed portion 4 extending from the back to the front of the bed 100 in the Z-axis direction. The depressed portion 4 is opened to a floor surface and a right end thereof is closed by a front surface of the bed 100. A cutting chips collecting device 8 for collecting cutting chips and coolant generated from the machining point at that time of a machining operation by the cutting tool 13 is installed in an exhaust bore formed in said bed 100. In the cutting chips collecting device 8, its horizontal portion is disposed into the depressed portion 4 from a rear end opening portion of the bed 100. A collection opening 81 of the collection device 8 is provided in the depressed portion 4 of the bed 100 at least under the table 3, in the form of taper which opening area gradually expands from a lower portion to an upper portion. Further, the depressed portion 4 opens to an upper surface of the bed 100 in the front of the column 101 so as to directly drop the cutting chips and coolant therein.

In the cutting chips collection device 8, a sprocket 82 is rotatably provided at a one end of the depressed portion 4 in the bed 100 and under the collection opening 81 in the form of taper, and a middle sprocket (not shown) is also arranged outside of the rear end surface of the bed 100. Further, the other sprocket (not shown) rotated by a motor 84 is arranged at an upper portion of the middle sprocket. The three sprockets including the sprocket 82 are connected by a chain 86 having a predetermined width on which scrapers 85 are placed at a predetermined interval. With this construction, it is configured to be collected and exhausted by carrying the cutting chips and coolant dropping into the collection opening 81 in the form of taper.

On the upper surface of the bed 100 and outside of the collection opening 81 in the form of taper, the pair of linear guideways 2 are horizontally arranged mutually perpendicular to the both X-axis and Y-axis to configure an X-axis, on which the worktable 3 for rotatably supporting a work pallet 32 to mount the workpiece 31 is slidably guided horizontally relative to the tool spindle 1.

A pair of feed screws 5 are arranged further outside of the linear guideways 2 mounted on the bed 100, which are rotatably engaged with nuts 51 provided at protrusive portions 33 protruding from both outside of the table 3, respectively. With this construction, it is so configured that each of the feed screws 5 is rotated by an independent driving motor 50. Namely, the servomotor 50 simultaneously rotated with a reduction gear 52 is arranged at one end of the ball screws 5, so that the worktable 3 is advanced and retracted relative to the tool spindle 1.

Inside of the each guideways 2 and in the upper portion of the collection opening 81 in the form of taper, a splash cover 9 arranged along with the each guideways 2 is composed of a under cover 91 which can change a cover area in the Z-axis direction with a movement of the worktable 3, and a fixed cover 90 perpendicularly arranged above the under cover 91.

Figure 8:
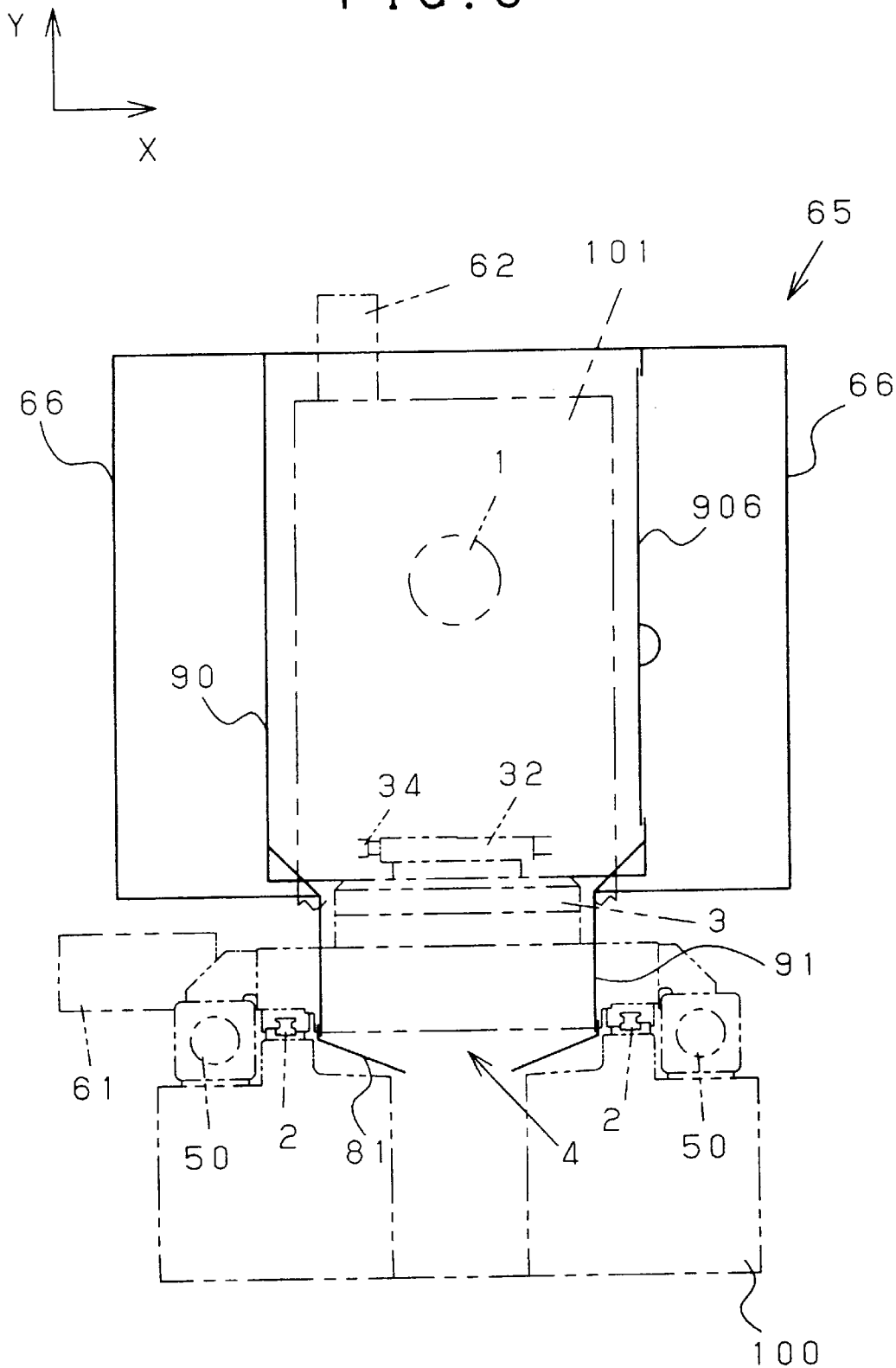
FIG. 8 is a front elevational view of the machine tool shown in FIG. 6.

As shown in FIGS. 6 and 8, at the front edge of the fixed cover 90, there is an entire cover 65 for covering the worktable 3 and the pallet changer 30, which cover consists of a straight cover 66 extending from the front edge of the fixed cover 90 and an arc cover 67 following from the straight cover 66. A front door 68 is provided at a front center portion of the arc cover 67, so that the workpiece 31 mounted on the pallet 32 can be changed by opening the front door 68.

Figure 9:
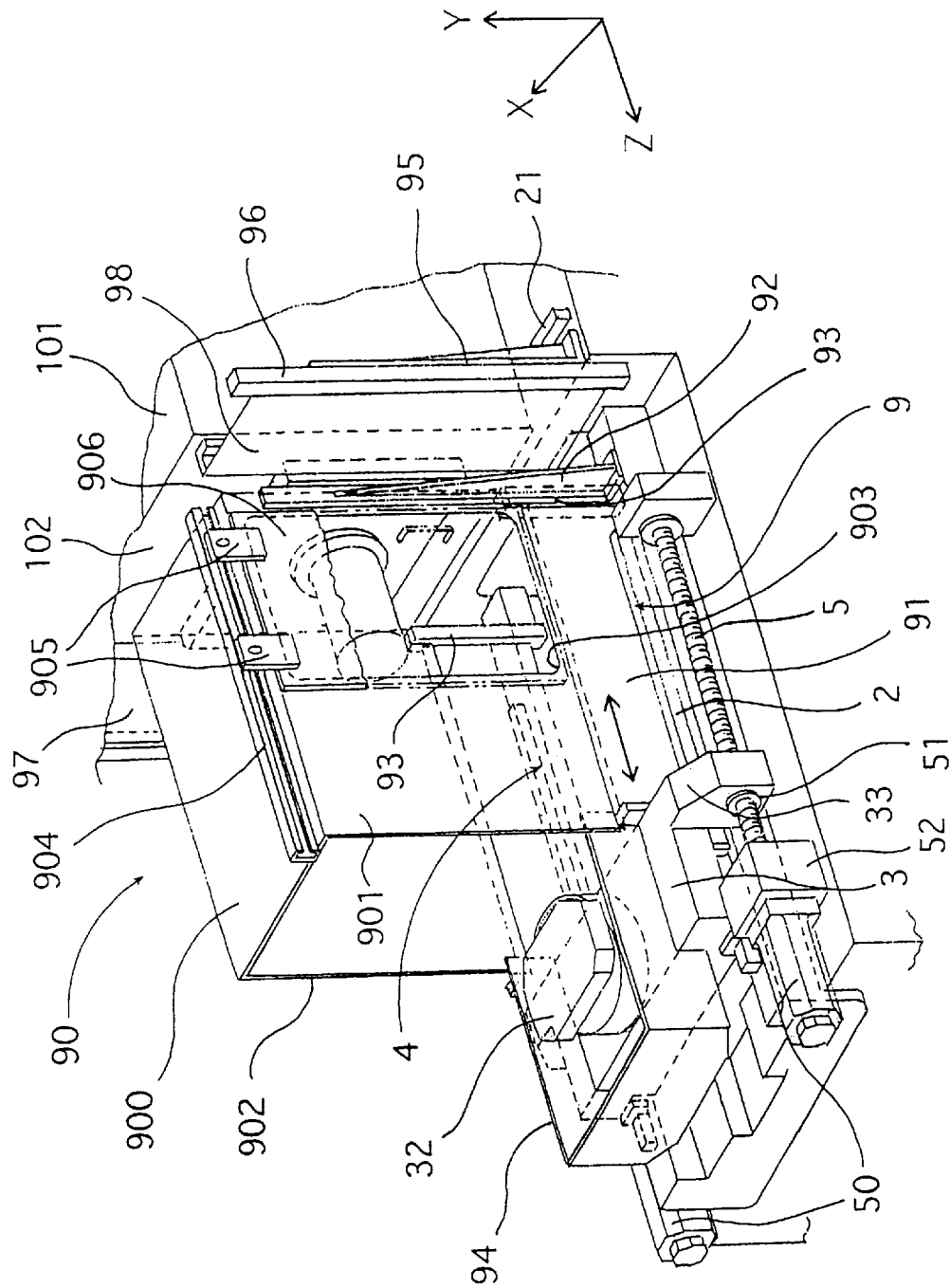
FIG. 9 is a perspective view of the machine tool equipped with a cover apparatus shown in FIG. 3.

In detail, above the collection opening 81 in the form of taper, one end of the rectangular fixed cover 90 is secured by a bracket 92 arranged on the bed 100 by the side of the column 101, which cover is composed of a rectangular upper surface 900 and both rectangular side surface portions 901 and 902, as shown in FIG. 9. There are lower end portions of the side surface portions 901 and 902 at a little higher position than the horizontal upper surface of the worktable 3. On the other hand, a rectangular window 903 for passing the spindle unit 12 therethrough is formed on the side surface portion 901. Further, a slide door 906 is slidably supported in the Z-axis direction by a pair of engaged portions 905 with a guide rail 904 arranged at one side end of the upper surface portion 900 in a longitudinal direction thereof, in which a hyaline plate is attached to a frame thereof.

The under cover 91 as an expandable cover is provided outside of the fixed cover 90 and inside of the linear guideways 2 so as to cover a gap from the lower end of the both side surface portions 901 and 902 of the fixed cover 90 until a little downside over the upper surface of the bed 100.

One ends of the expandable under covers 91 are respectively fixed to base portions of protrusive portions 33 formed both outside of the worktable 3, while the others thereof are respectively attached to wind devices 93 arranged close to the brackets 92 for supporting the fixed cover 90, so that it can be wound in correspondence with the movement of worktable 3 relative to the tool spindle 1.

A fixed cover 94 is arranged to cover three planes without a plane facing with the tool spindle 1 wherein inside surfaces of the both side surface portions 901 and 902 of the fixed cover 90 overlap with the fixed cover 94 at an upper portion thereof.

One ends of expandable covers 97 and 98 are respectively fixed to both ends of the front surface 102 of the column 101 in the X-axis direction, while the other ends thereof are respectively attached to wind devices 96 which are arranged at both ends of brackets 95 mounted on the bed 100 in the X-axis direction, so that it is so constructed that the expandable covers 97 and 98 can be respectively wound by the wind devices 96 in correspondence with the movement of the column 101 in the x-axis direction.

In the worktable feed mechanism of the machine tool according to the embodiment as above-mentioned, when the ball screws 5 are simultaneously operated through the reduction mechanisms 52 with the rotation of the servomotors 50, the worktable 3 is advanced and retracted relative to the tool spindle 1 along the pair of guideways 2 mounted on the upper surface of the bed 100.

Particularly, the worktable 3 is disposed along the linear guideways 2 into the fixed cover 90 in the form of rectangle in the sectional view consisting of the rectangular upper surface portion 900 and the rectangular side surface portions 901 and 902, on which the work pallet 31 mounting the workpiece 31 is rotatably mounted. With this construction, the machining operation at the machining portion 10 is performed in case that the machining portion 10 is covered by the fixed cover 90, and the worktable 3 is retracted to a retractive position thereof after the machining operation. During the machining operation, the column 101 is moved in the X-axis direction upon rotation of the servomotor 61, and also the spindle head 11 is moved in the Y-axis direction by the rotation of the servomotor 62. With this movement, the tool 13 rotating with the tool spindle 1 is moved within the fixed cover 90 on a horizontal plane perpendicular to the movement of the worktable 3.

A part of the cutting chips and coolant splashing from the machining portion 10 in the machine operation is collected into the depressed portion 4 extendedly formed in the Z-axis direction at the middle portion of the bed 100 in the X-axis direction, by directly dropping. On the other hand, the remain of the cutting chips and coolant is also collected into the depressed portion 4 after coming into contact with the fixed cover 90 and expandable cover 91. Particularly, the collection opening 81 of the depressed portion 4 is upwardly open in the form of taper and its opening area gradually increases upwardly from its bottom, so that the cutting chips and coolant is infallibly collected to the cutting chips collection device 8 through the collection opening 81.

The cutting chips heaped on an upper surface of a bottom plate of the cutting chips collection device 8 are scraped by the scrapers 85 which are spaced on the chain 80 at a constant interval wound on the sprocket 82, and are carried to the outside of the bed 100 by the orbit movement of chains 86 and scrapers 85, thereby being collected to a collecting bucket 89 arranged at the back of the column 101.

Further, the splash cover 9 is arranged both inside of the linear guideways 2 and ball screws 5, so that the cutting chips and the coolant splashed from the machining point in the machining operation is prevented from splashing outwardly of the machine tool, whereby the cutting chips and the coolant cannot be heaped on the ball screws 5 and the linear guideways 2.

Namely, the rectangular fixed cover 90 covers the machining portion 10 and the worktable 3 inside of the ball screws 5 and linear guideways 2, so that the cutting chips and coolant can be prevented from splashing outside of the machining point. Further, since the expandable cover 91 arranged below the fixed cover 90 is expandable in correspondence with the worktable 3 relative to the tool spindle 1, the cutting chips and coolant can be prevented from splashing from the space between the lower end of the fixed cover 90 and the upper surface of the bed 100.

Furthermore, the backside of the worktable 3 is closed by the pallet changer cover 35, so that the cutting chips and coolant cannot be splashed outside of the machine tool.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool having a worktable feed mechanism in which a worktable is moved in a horizontal direction relative to a tool spindle along a pair of guideways in parallel with the horizontal direction, said machine tool comprising:

a base;

a cutting chips collection space formed between the pair of guideways fixed to said base;

a pair of ball screws for moving the worktable relative to the tool spindle in the horizontal direction; and a splash cover arranged between said ball screws and said cutting chips collection space for preventing the cutting chips from splashing outside the machine tool.

2. A machine tool according to claim 1, wherein said ball screws are arranged outside of the pair of guideways.

3. A machine tool according to claim 1, further comprising:

a collection opening serving as said cutting chips collection space and formed in said base, which opening area is open upwardly; and an exhaust bore formed in said base under said collection opening, wherein the cutting chips is collected from said a collection opening and exhausted through said exhaust bore to a cutting chips collection device arranged behind said base.

4. A machine tool having a worktable feed mechanism in which a worktable is moved in a horizontal direction relative to a tool spindle along a pair of guideways in parallel with the horizontal direction, said machine tool comprising:

a base;

a cutting chips collection space formed between the pair of guideways fixed to said base;

a pair of ball screws for moving the worktable relative to the tool spindle in the horizontal direction;

a pallet arranged on said worktable for mounting a workpiece to be machined; and a rotatably mounted pallet changer changing said pallet upon rotation thereof at a retracted position of said worktable, said pallet changer comprising:

a pallet changer cover provided on a rotational center of said pallet changer and rotating therewith for covering said workable and said pallet at the retractive position of said worktable.

5. A machine tool according to claim 1, wherein said splash cover is composed of an expandable cover changing a cover area thereof in the horizontal direction with the movement of the worktable and a fixed cover arranged on said expandable cover.

6. A machine tool according to claim 1, wherein said pair of ball screws are rotationally driven by independent motors respectively.

7. A machine tool according to claim 4, further comprising:

an entire cover continuedly provided from said fixed cover for covering a rotational area of said pallet changer cover upon rotation of said pallet changer.

8. A machine tool according to claim 2, further comprising:

a collection opening serving as said cutting chips collection space and formed in said base, which opening area is open upwardly; and an exhaust bore formed in said base under said collection opening, wherein the cutting chips is collected from said a collection opening and exhausted through said exhaust bore to a cutting chips collection device arranged behind of said base.

9. A machine tool according to claim 5, wherein said pair of ball screws are rotationally driven by independent motors respectively.

* * * * *